United States Patent
Ratasuk et al.

(10) Patent No.: US 9,307,548 B2
(45) Date of Patent: Apr. 5, 2016

(54) BAND AND CHANNEL SELECTION IN 5G

(71) Applicant: NOKIA SOLUTIONS AND NETWORKS OY, Espoo (FI)

(72) Inventors: Rapeepat Ratasuk, Hoffman Estates, IL (US); Mikko Aleksi Uusitalo, Helsinki (FI); Nitin Mangalvedhe, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 161 days.

(21) Appl. No.: 14/104,086

(22) Filed: Dec. 12, 2013

(65) Prior Publication Data

US 2015/0173091 A1 Jun. 18, 2015

(51) Int. Cl.
- *H04W 72/00* (2009.01)
- *H04W 72/08* (2009.01)
- *H04W 72/04* (2009.01)
- *H04W 16/10* (2009.01)
- *H04W 24/10* (2009.01)
- *H04W 88/08* (2009.01)

(52) U.S. Cl.
CPC ............ *H04W 72/085* (2013.01); *H04W 16/10* (2013.01); *H04W 24/10* (2013.01); *H04W 72/0453* (2013.01); *H04W 88/08* (2013.01)

(58) Field of Classification Search
CPC ............ H04W 16/14; H04W 72/0453; H04W 72/087
USPC ......... 455/12.1, 13.2, 427, 452.2, 423, 456.1, 455/41.2
See application file for complete search history.

(56) References Cited

U.S. PATENT DOCUMENTS

| | | | | |
|---|---|---|---|---|
| 7,280,607 | B2 * | 10/2007 | McCorkle et al. | 375/295 |
| 7,388,541 | B1 * | 6/2008 | Yang | 342/464 |
| 2003/0161411 | A1 * | 8/2003 | McCorkle et al. | 375/295 |
| 2008/0225789 | A1 | 9/2008 | Kim et al. | |
| 2010/0105408 | A1 | 4/2010 | Palmer et al. | |
| 2011/0182174 | A1 | 7/2011 | Pi et al. | |
| 2012/0058794 | A1 * | 3/2012 | Valentine | 455/513 |
| 2012/0194817 | A1 * | 8/2012 | Funayama et al. | 356/402 |
| 2013/0005374 | A1 | 1/2013 | Uusitalo et al. | |
| 2014/0080535 | A1 * | 3/2014 | Gauvreau et al. | 455/513 |
| 2014/0269849 | A1 * | 9/2014 | Abdelmonem et al. | 375/148 |

FOREIGN PATENT DOCUMENTS

JP 2008-236409 A 10/2008

OTHER PUBLICATIONS

International Search Report application No. PCT/EP2014/073005 dated May 22, 2015.

(Continued)

*Primary Examiner* — Joseph Arevalo
(74) *Attorney, Agent, or Firm* — Squire Patton Boggs (US) LLP

(57) ABSTRACT

Systems, methods, apparatuses, and computer program products for band and channel selection in a radio system are provided. One method includes generating, by a network entity, at least one performance map showing performance for different portions of spectrum in a wideband radio system. The method may further include combining the at least one performance map with dynamic information, and selecting at least one portion of the spectrum to use for access based on the combined at least one performance map and dynamic information.

17 Claims, 4 Drawing Sheets

(56) References Cited

OTHER PUBLICATIONS

Mark Cudak et al., "Moving Towards MMWAVE-Based Beyond-4G (B-4G) Technology", in Proc. IEEE Veh. Technol. Soc. Cont., 2013, 5 pages.

Ian F. Akyildiz et al., "A Survey on Spectrum Management in Cognitive Radio Networks", Cognitive Radio Communications and Networks, IEEE Communications Magazine Apr. 2008, pp. 40-48.

Natasha Devroye et al., "Cognitive Radio Networks" IEEE Signal Processing Magazine, Nov. 2008, pp. 12-23.

Ghurumuruhan Ganesan et al., "Cooperative Spectrum Sensing in Cognitive Radio Networks", Published in New Frontiers in Dynamic Spectrum Access Networks, 2005, DySPAN 2005, 2005 First IEEE International Symposium on Nov. 8-11, 2005, pp. 137-143.

* cited by examiner

BAND AND CHANNEL SELECTION IN 5G

BACKGROUND

1. Field

Certain embodiments generally relate to communication systems and, in particular, may relate to millimeter wave (mmWave) communications.

2. Description of the Related Art

A global bandwidth shortage facing wireless carriers has motivated the consideration of the underutilized millimeter wave (mmWave) frequency spectrum for future broadband cellular communication networks mmWave (or extremely high frequency) generally refer to the frequency range between 30 and 300 gigahertz. This is the highest radio frequency band in practical use today. Radio waves in this band have wavelengths from ten to one millimeter, giving it the name millimeter band or millimeter wave.

The amount of wireless data might increase one thousand fold over the next ten years. Essential elements in solving this challenge include obtaining more spectrum, having smaller cell sizes, and using improved technologies enabling more bits/s/Hz. An important element in obtaining more spectrum is to move to higher frequencies, above 6 GHz. For fifth generation wireless systems (5G), an access architecture for deployment of cellular radio equipment employing mmWave radio spectrum has been proposed. In addition to extending cellular service into the mmWave band, dynamic spectrum access is an important technique to improve spectrum utilization.

SUMMARY

One embodiment is directed to a method including generating, by a base station, at least one performance map showing performance for different portions of spectrum in a wideband radio system. The method may further include combining the at least one performance map with dynamic information, and selecting at least one portion of the spectrum to use for access based on the combined at least one performance map and dynamic information.

Another embodiment is directed to an apparatus including at least one processor, and at least one memory comprising computer program code. The at least one memory and the computer program code are configured, with the at least one processor, to cause the apparatus at least to generate at least one performance map showing performance for different portions of spectrum in a wideband radio system, combine the at least one performance map with dynamic information, and select at least one portion of the spectrum to use for access based on the combined at least one performance map and dynamic information.

Another embodiment is directed to a computer program embodied on a computer readable medium. The computer program is configured to control a processor to perform a process including generating at least one performance map showing performance for different portions of spectrum in a wideband radio system, combining the at least one performance map with dynamic information, and selecting at least one portion of the spectrum to use for access based on the combined at least one performance map and dynamic information.

BRIEF DESCRIPTION OF THE DRAWINGS

For proper understanding of the invention, reference should be made to the accompanying drawings, wherein.

DETAILED DESCRIPTION

Figure 1A:
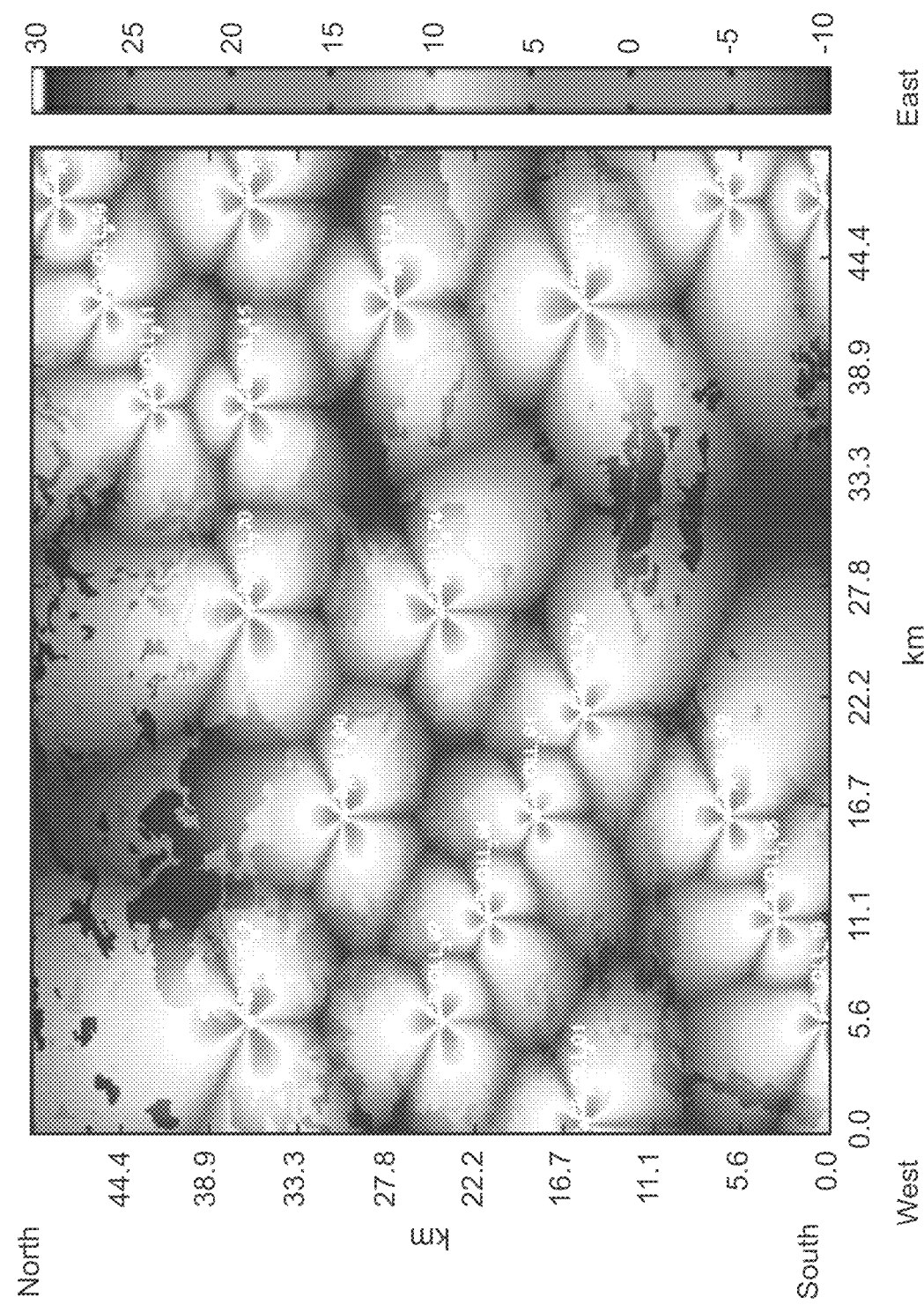
FIG. 1a illustrates an example performance map for 885 MHz, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for band and channel selection in wideband radio system, such as 5G, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, the quantity of wireless data is expected to increase one thousand fold in the following ten years. In order to handle this increase in data usage, more spectrum needs to be obtained, smaller cell sizes may need to be utilized, and improved technologies enabling more bits/s/Hz may need to be used. An essential element in obtaining more spectrum is to move to higher frequencies, for example, above 6 GHz. For 5G, an access architecture for deployment of cellular radio equipment employing mmWave radio spectrum has been proposed.

The availability of huge bandwidth (e.g., 13 GHz in the 70-80 GHz band) coupled with the use of large antenna arrays with as many as 8 to 64 elements (9 to 18 dB in link budget gain) at both transmitter and receiver can make this band attractive for deploying high capacity 5G networks. An exemple peak data rate for mmWave system is 10 Gbps with cell edge data rate of 0.5 Gbps. The major challenges for deploying mmWave system are the propagation conditions. They include higher pathloss, high shadowing loss (e.g., buildings, trees, or other obstacles that can block mmWave) and low diffraction, oxygen and water absorption, rain loss, and foliage loss. Therefore, when using these higher frequencies, in line-of-sight communication (LOS) is preferable.

Therefore, it is important to acquire information on the suitability of LOS for connecting certain nodes.

In addition to extending cellular service into the mmWave band, dynamic spectrum access is an important technique to improve spectrum utilization. In general, dynamic spectrum access allows spectrum usage in an opportunistic manner, thus allowing service to be provided using the best available spectrum. Also, it allows for more efficient use of a scare resource as spectrum is not dedicated to only a single operator. The main functions of dynamic spectrum access come from the history of cognitive radio networks and include spectrum sensing, sharing, and management.

With novel enabling techniques and extending cellular service into the mmWave band, large spectrum band (e.g., from 1-90 GHz) will be available for dynamic access. However, different bands have different radio characteristics including propagation conditions, pathloss, diffraction, reflection, impact from terrain, foliage, LOS, and in-building penetration. In addition, different bands also have different available bandwidth and legacy usage, as well as regulatory requirements. As a result, it is not sufficient to simply select spectrum for access based on measurement reports and sensing, but to also consider other aspects as will be described below.

It may be assumed that a UE would be covered as needed with a cellular connection over traditional frequencies, like with LTE. Higher frequencies with more available spectrum would be used when additional capacity is needed, as facilitated by the embodiments discussed herein. Accordingly, certain embodiments of the present invention may be applicable to a wideband radio system (e.g., covering 1-90 GHz) where conditions can be quite different for different portions of the spectrum.

One embodiment is directed to the network creating performance maps for different portions of the spectrum. A performance metric may include, for example, Reference Signal Received Power (RSRP)/Reference Signal Received Quality (RSRQ), Signal to Interference plus Noise Ratio (SINR), spectral efficiency (SE), or throughput. Maps can include information regarding terrain, surroundings (e.g., trees, lamp posts, etc), buildings, weather, foliage, load metric, etc. These performance maps may be somewhat semi-static (i.e., slow changing for example in order of hours). The performance maps can be generated and refined using existing feedback from UEs (e.g., channel quality indicator (CQI), RSRP/RSRQ). According to this embodiment, the performance map may be specific to the radio access technology that will be used in that portion of the spectrum, such as when SE or throughput is the performance metric.

In an embodiment, the network may take semi-static performance maps and combine them with dynamic information such as available bandwidth from sensing and user specific information (e.g., location, speed, and direction). The network may then select a portion of the spectrum to use for access based on the performance maps. It should be noted that different portions of the spectrum may be selected for different users.

According to an embodiment, a central entity in the network, such as each macro base station, may select which connection in its coverage area should use higher frequencies by collecting information, for example, on: location of the UE in question, location of the access points providing connectivity that could support communication using higher frequencies, potential movement of the UE, predicted path of the UE, coverage of the small cell(s), and/or overall usage of different available bands and channels for different connectivity and their current and expected load(s).

This information may be combined with map information (outdoor and indoor) including the type of the terrain and potential blocking elements for line of sight (LOS) communication, such as trees, pillars and other supporting elements, and/or other objects with reasonable heights.

The impact of current weather and climate on coverage may also be incorporated into the map information by updating it at appropriate periods with feedback from UEs. Such weather conditions may include weather (e.g., fog, rain, snow), as well as whether foliage is present (i.e., changes with time of year, type of trees, etc.).

Figure 1B:
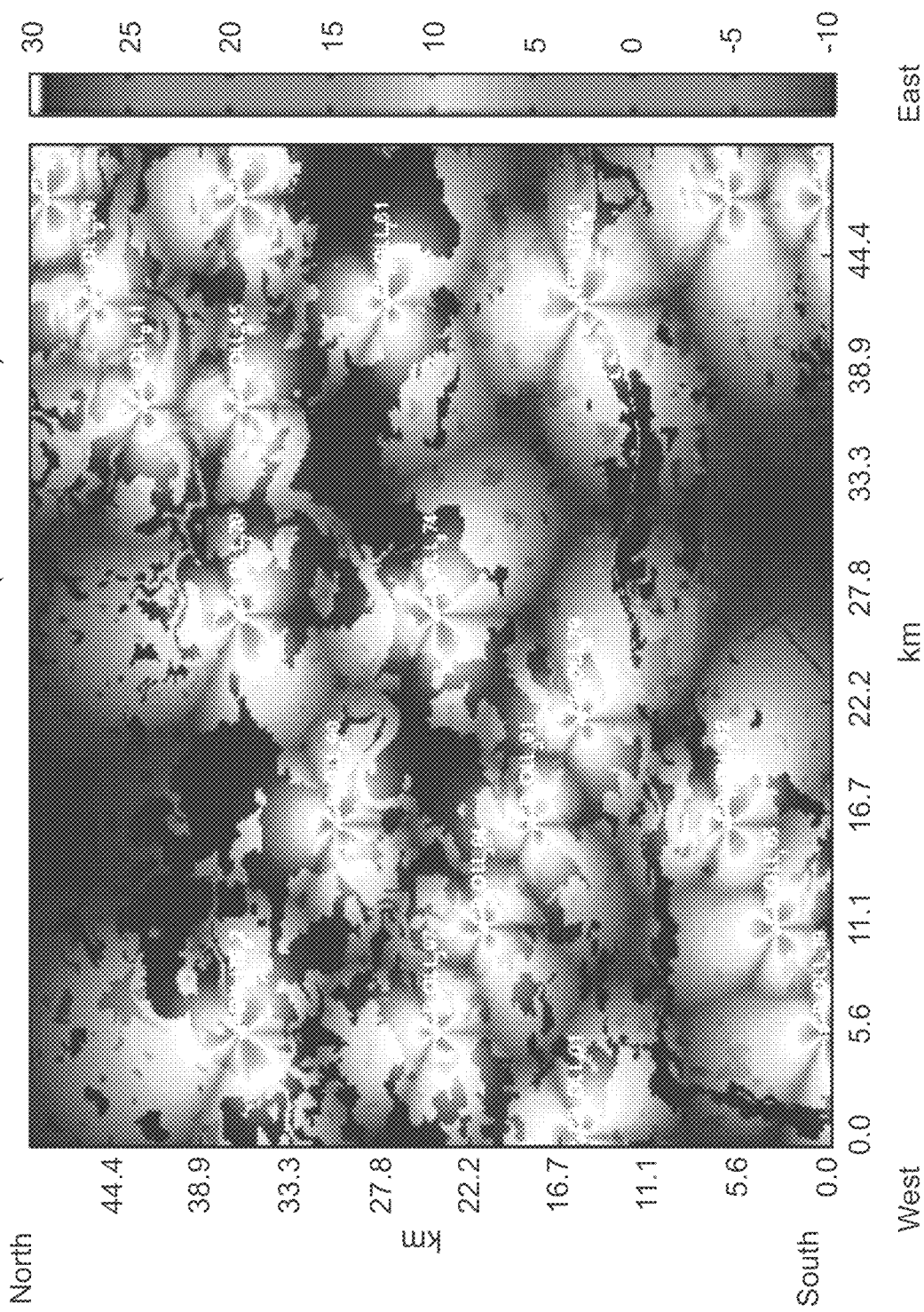
FIG. 1b illustrates an example performance map for 2.6 GHz, according to one embodiment.

FIGS. 1a and 1b illustrates example semi-static performance maps for two frequency bands, according to one embodiment. In particular, FIG. 1a illustrates a performance map for 885 MHz and FIG. 1b illustrates a performance map for 2.6 GHz. In this example, downlink SINR from the best serving cell is shown and used as the performance metric. From the maps, it can be seen that performance can be quite different at different bands. The network may take these semi-static maps and add additional information such available bandwidth from sensing to come up with dynamic maps. Then, based on the maps and information such as UE location, speed, and direction, the network can select the appropriate band for access by the UE.

Therefore, certain embodiments are directed to using performance maps and related information for choosing the correct or optimum allocation of resources. This optimum allocation of resources may include the right selection of bands and channels, including for example selection of traditional lower frequencies and/or novel higher frequencies. For example, if it is known that the UE is soon going to leave the limited range small cell or is going to have difficulties in establishing linkage at high frequencies, then high frequencies and the corresponding small cell would not be used.

In some embodiments, related information to the maps may include geographical and terrain information as "visible" to usage of radio—access point location, obstacles such as trees, pillars and other objects influencing propagation and line of sight conditions etc. The related information may also include user information—user location, movement, tracks, predicted tracks of movement, etc., and weather and seasonal information as "visible" to usage of radio—foliage, rain, or snow.

In one embodiment, information on the map may be dependent on the technology to be used for wireless connectivity, if such a dependency exists for the particular information.

In view of the above, some of the main features of the invention may include the creation of the performance map with novel information elements and including spectrum sensing, the periodic update of the map based on feedback from UEs, and architecture and signalling to use the map, in combination with other system and UE metrics, for band and channel selection.

According to certain embodiments, this kind of map information or at least part of the information could also be provided in association with navigation maps, such as Nokia™ HERE maps and services. This could be an especially attractive offering for novel or local and small operators and for novel frequency bands where this information would be especially valuable.

In one embodiment, the network may select different portions of the spectrum for the purpose of creating the performance maps. This selection may be based, for example, on radio propagation characteristics, pathloss exponents, LOS requirements, oxygen and water absorption characteristics, and penetration characteristics.

In another embodiment, the network or UE may transmit signals such as pilots, beacons, or synchronization signals for measurement in different portions of the spectrum. Alternately, wideband signals covering the entire spectrum of interest can be used. In yet another embodiment, the network or UE may make measurements in a portion of the spectrum by simply listening to ongoing transmissions in that portion of the spectrum.

According to another embodiment, the network may use measurements in one portion of the spectrum to estimate the performance in another portion of the spectrum. This may be done, for example, through adjusting and applying different pathloss exponents to measurements from one portion of the spectrum.

In another embodiment, the network may adjust the performance maps based on expected environmental changes such as weather conditions (e.g., rain or snow) and vehicular and pedestrian traffic density (e.g., rush hour, train arrival, etc.). In yet another embodiment, the network may adjust the performance maps based on spectrum usage by the network. That is, as spectrum is dynamically allocated by the network, the maps may be adjusted to reflect this usage including bandwidth availability, interference, and load.

Figure 2:
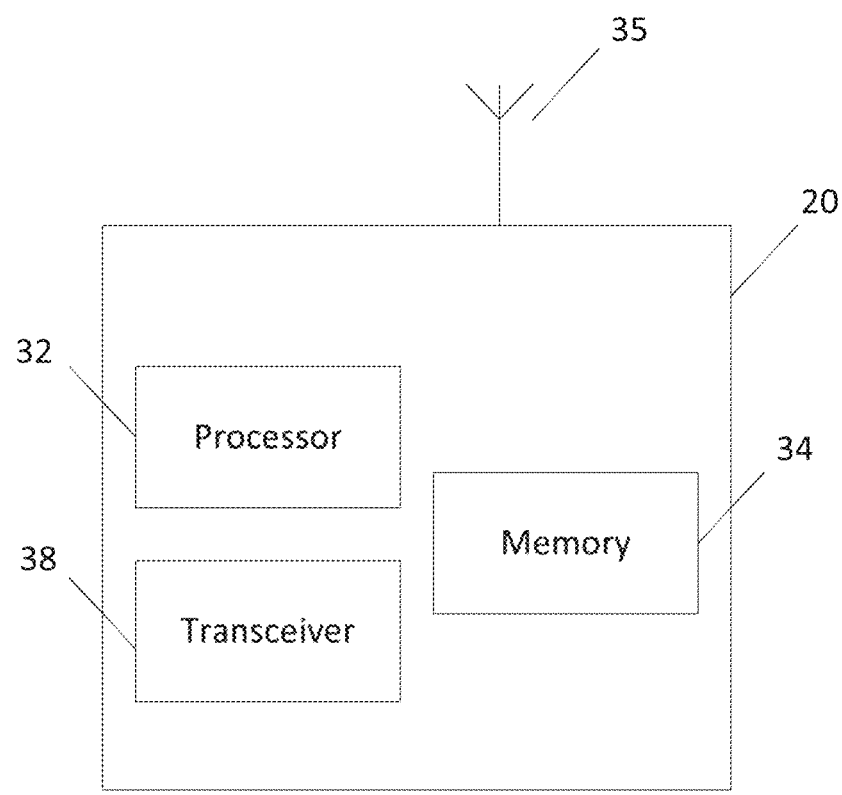
FIG. 2 illustrates an apparatus according to one embodiment.

FIG. 2 illustrates an example of an apparatus 20 according to an embodiment. In an embodiment, apparatus 20 may be a base station in a communications network, such as a base station in a wideband radio system. It should be noted that one of ordinary skill in the art would understand that apparatus 20 may include components or features not shown in FIG. 2. Only those components or features necessary for illustration of the invention are depicted in FIG. 2.

As illustrated in FIG. 2, apparatus 20 includes a processor 32 for processing information and executing instructions or operations. Processor 32 may be any type of general or specific purpose processor. While a single processor 32 is shown in FIG. 2, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station in a communications network, such as a base station in a 5G radio system. In this embodiment, apparatus 20 may be controlled by memory 34 and processor 32 to create performance maps for different portions of the spectrum in a wideband radio system. In an embodiment, performance may be measured via RSRP/RSRQ, SINR, SE, or throughput. Some of these parameters are technology dependent and may thus be recorded in association to a certain technology. The performance maps may include information regarding terrain, surroundings (e.g., trees, lamp posts, etc.), buildings, weather, foliage, load metric, etc. These performance maps may be semi-static (i.e., slow changing for example in order of hours). In an embodiment, the performance maps can be generated and refined using existing feedback from UEs, such as CQI, RSRP/RSRQ.

For access, in an embodiment, apparatus 20 may be controlled by memory 34 and processor 32 to take the semi-static performance maps and combine them with dynamic information such as available bandwidth from sensing and user specific information (e.g., location, speed, and direction). Based on the information, apparatus 20 may be controlled by memory 34 and processor 32 to select a portion or portions of the spectrum to be used for access. The use of a performance map combined with other dynamic information has an advantage of providing stable wireless connectivity at the expected quality (e.g., throughput, SINR).

Figure 3:
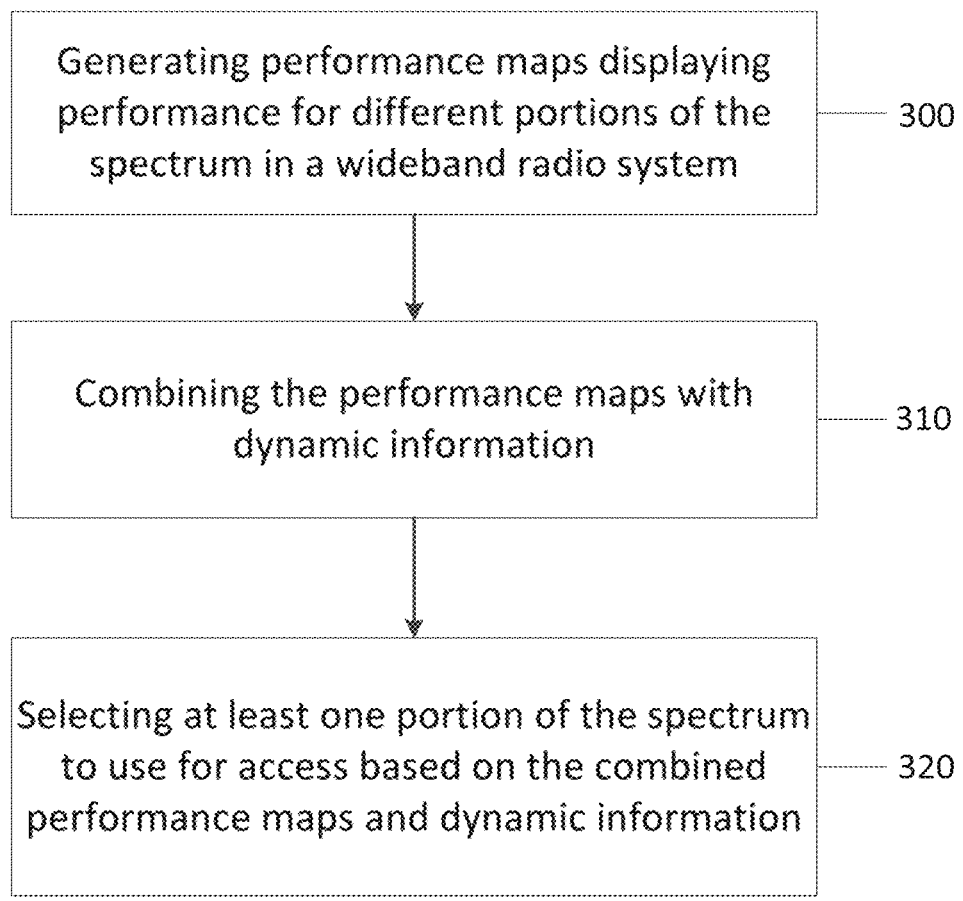
FIG. 3 illustrates a flow chart of a method according to an embodiment.

FIG. 3 illustrates an example of a flow diagram of a method, according to one embodiment. In some embodiments, the method illustrated in FIG. 3 may be performed by a base station, such as a macro base station. The method may include, at 300, generating one or more performance maps showing performance for different portions of spectrum in a wideband radio system. In some embodiments, the wideband radio system may be a 5G radio system and the performance map(s) may be semi-static. The method may then include, at 310, combining the performance map(s) with dynamic information. The dynamic information may include available bandwidth measure from sensing or user equipment (UE) specific information, such as location, speed, and/or direction of the UE. The method may further include, at 320, selecting at least one portion of the spectrum to use for access based on the combined performance map(s) and dynamic information.

In certain embodiments, the performance for the different portions of the spectrum is measured via channel quality indicator (CQI), Reference Signal Received Power (RSRP)/Reference Signal Received Quality (RSRQ), Signal to Interference plus Noise Ratio (SINR), spectral efficiency, and/or throughput. Further, according to some embodiments, the performance map(s) may include information regarding at least one of terrain, surroundings, buildings, weather, foliage, or load metric.

In some embodiments, the functionality of any of the methods described herein, such as those illustrated in FIG. 3 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention provide several advantages. For example, some advantages include better spectral efficiency and capacity via optimal use of spectral resources and/or less breaks in usage of different frequencies needing different connectivity criteria. Accordingly, embodiments may provide optimal performance based on the circumstances One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims

We claim:

1. A method, comprising:
    generating, by a network entity, at least one performance map showing performance for different portions of spectrum in a wideband radio system;
    combining the at least one performance map with dynamic information;
    selecting at least one portion of the spectrum to use for access based on the combined at least one performance map and dynamic information; and
    using measurements in one portion of the spectrum to estimate performance in another portion of the spectrum by adjusting and applying different pathloss exponents to measurements from the one portion of the spectrum,
    wherein the at least one performance map is semi-static, and
    wherein the dynamic information comprises available bandwidth measured from spectrum measurements.

2. The method according to claim 1, wherein the at least one performance map is updated at specified intervals.

3. The method according to claim 1, wherein the UE specific information comprises at least one of location, speed, direction, or predicted path.

4. The method according to claim 1, wherein the performance for the different portions of the spectrum is measured via a performance metric comprising at least one of channel quality indicator (CQI), Reference Signal Received Power (RSRP)/Reference Signal Received Quality (RSRQ), Signal to Interference plus Noise Ratio (SINR), spectral efficiency, or throughput.

5. The method according to claim 4, further comprising evaluating the performance metric for the wideband radio system to be used in that portion of the spectrum.

6. The method according to claim 1, wherein the at least one performance map comprise information regarding at least one of terrain, surroundings, buildings, weather, foliage, or load metric.

7. The method according to claim 1, wherein the network entity comprises a macro base station.

8. The method according to claim 1, further comprising transmitting pilot, beacon, or synchronization signals for measurement in different portions of the spectrum.

9. The method according to claim 1, further comprising transmitting wideband signals covering the entire spectrum.

10. The method according to claim 1, further comprising adjusting the at least one performance map based on expected environmental changes.

11. An apparatus, comprising:
    at least one processor; and
    at least one memory including computer program code,
        wherein the at least one memory and the computer program code are configured, with the at least one processor, to cause the apparatus at least to
    generate at least one performance map showing performance for different portions of spectrum in a wideband radio system;
    combine the at least one performance map with dynamic information;
    select at least one portion of the spectrum to use for access based on the combined at least one performance map and dynamic information; and
    use measurements in one portion of the spectrum to estimate performance in another portion of the spectrum by adjusting and applying different pathloss exponents to measurements from the one portion of the spectrum,
    wherein the at least one performance map is semi-static, and
    wherein the dynamic information comprises available bandwidth measured from spectrum measurements.

12. The apparatus according to claim 11, wherein the at least one performance map is updated at specified intervals.

13. The apparatus according to claim 11, wherein the UE specific information comprises at least one of location, speed, direction, or predicted path.

14. The apparatus according to claim 11, wherein the performance for the different portions of the spectrum is measured via a performance metric comprising at least one of channel quality indicator (CQI), Reference Signal Received Power (RSRP)/Reference Signal Received Quality (RSRQ), Signal to Interference plus Noise Ratio (SINR), spectral efficiency, or throughput.

15. The apparatus according to claim 11, wherein the at least one performance map comprise information regarding at least one of terrain, surroundings, buildings, weather, foliage, or load metric.

16. The apparatus according to claim 11, wherein the apparatus comprises a macro base station.

17. A computer program, embodied on a non-transitory computer readable medium, the computer program configured to control a processor to perform a process, comprising:
    generating at least one performance map showing performance for different portions of spectrum in a wideband radio system;
    combining the at least one performance map with dynamic information;
    selecting at least one portion of the spectrum to use for access based on the combined at least one performance map and dynamic information; and
    using measurements in one portion of the spectrum to estimate performance in another portion of the spectrum by adjusting and applying different pathloss exponents to measurements from the one portion of the spectrum,
wherein the at least one performance map is semi-static, and
wherein the dynamic information comprises available bandwidth measured from spectrum measurements.

\* \* \* \* \*